(12) United States Patent
Lin

(10) Patent No.: US 6,715,214 B1
(45) Date of Patent: Apr. 6, 2004

(54) RETRACTABLE TAPE MEASURE

(76) Inventor: Shin-Cheng Lin, No. 10, Yenping S. Rd., Taipei (TW)

( * ) Notice: Subject to any disclaimer, the term of this patent is extended or adjusted under 35 U.S.C. 154(b) by 0 days.

(21) Appl. No.: 10/347,195

(22) Filed: Jan. 21, 2003

(51) Int. Cl.$^7$ ................................................. G01B 3/10
(52) U.S. Cl. ............................ 33/755; 33/761; 242/372
(58) Field of Search .......................... 33/755, 761, 759, 33/760, 764, 768, 769; 242/372

(56) References Cited

U.S. PATENT DOCUMENTS

| | | | | | |
|---|---|---|---|---|---|
| 1,820,789 | A | * | 8/1931 | Farrand | 33/755 |
| 1,988,428 | A | * | 1/1935 | Carlson | 33/761 |
| 3,885,314 | A | * | 5/1975 | Banas, Sr. | 33/764 |
| 4,479,617 | A | * | 10/1984 | Edwards | 33/761 |
| 4,506,446 | A | * | 3/1985 | Mitchell | 33/764 |
| 4,527,334 | A | * | 7/1985 | Jones et al. | 33/761 |
| 4,794,692 | A | * | 1/1989 | Wang | 33/760 |
| 5,014,437 | A | * | 5/1991 | Sun | 33/761 |
| 5,033,202 | A | * | 7/1991 | Chen | 33/768 |
| 5,060,394 | A | * | 10/1991 | Lincoln et al. | 33/761 |
| 6,098,757 | A | * | 8/2000 | Stephenson | 242/372 |
| 6,243,964 | B1 | * | 6/2001 | Murray | 33/769 |

* cited by examiner

*Primary Examiner*—G. Bradley Bennett
(74) *Attorney, Agent, or Firm*—Rabin & Berdo, P.C.

(57) ABSTRACT

A retractable tape measure includes a cover, a base and a calibrated tape. The internal configuration of the retractable tape measure allows a much longer calibrated tape to be used than a conventional measuring tape.

3 Claims, 3 Drawing Sheets

RETRACTABLE TAPE MEASURE

BACKGROUND OF THE INVENTION

1. Field of the Invention

The present invention relates to a retractable tape measure, and more particularly to a retractable tape measure that can measure longer distances.

2. Description of Related Art

A retractable tape measure is a convenient tool to measure distance. With the reference to the FIG. 3, a conventional retractable tape measure has a base (40), a top cover (not shown) and a calibrated tape (47).

The base (40) has four corners and four sides and includes four supporting bosses (41), a tape slot (401), a pin (43) and a flat coil spring (45). Each supporting boss (41) has a hole (42) and is mounted near a corresponding corner of the base (40). The tape slot (401) is defined through one side of the base (40) near a corner. The pin (43) is mounted in the center of the base (40), and a slot (44) is defined longitudinally in the pin (43). The flat coil spring (45) has an inner end (not numbered) and an outer end (not numbered). A hook (46) is formed on the inner end of the flat coil spring (45) and is securely attached to the slot (44) in the pin (43). The calibrated tape (47) has a proximal end (not numbered) and a distal end (not numbered). The proximal end is attached to the outer end of the flat coil spring (45), and the calibrated tape (47) is wound around the flat coil spring (45). A rigid lip (48) is attached to the distal end of the calibrated tape (47). The rigid lip (48) extends out of and hooks the tape slot (401) to keep the calibrated tape (47) from completely retracting into the base (40) and top cover.

The conventional retractable tape measure is easy to carry, but only a fixed length of calibrated tape (47) can be wound on the flat coil spring (45) attached to the pin (43), and the measuring tape can only measure a distance equal to the length of the calibrated tape (47) at one time. When the distance to be measured is longer than the calibrated tape (47), the retractable tape measure must be used repeatedly and the distances added to obtain the total distance. If the space in the base (40) were able to be fully used to carry a longer calibrated tape (47), the tape measure would be able to measure longer distances in a single operation and be more convenient to use.

To overcome the shortcomings, the present invention provides a means of winding a longer calibrated tape in a retractable tape measure to mitigate or obviate the aforementioned problems.

SUMMARY OF THE INVENTION

The primary objective of the present invention is to mount a longer calibrated tape in a given retractable tape measure base. The retractable tape measure in accordance with the present invention uses two internal coil springs and an elliptical belt mounted around the two coil springs. The elliptical belt has a circumference significantly larger than that of a single coil spring of a conventional one. This allows the calibrated tape to be distributed more efficiently inside the retractable tape measure.

Other objects, advantages and novel features of the invention will become more apparent from the following detailed description when taken in conjunction with the accompanying drawings.

DETAILED DESCRIPTION OF THE PREFERRED EMBODIMENT

Figure 1:
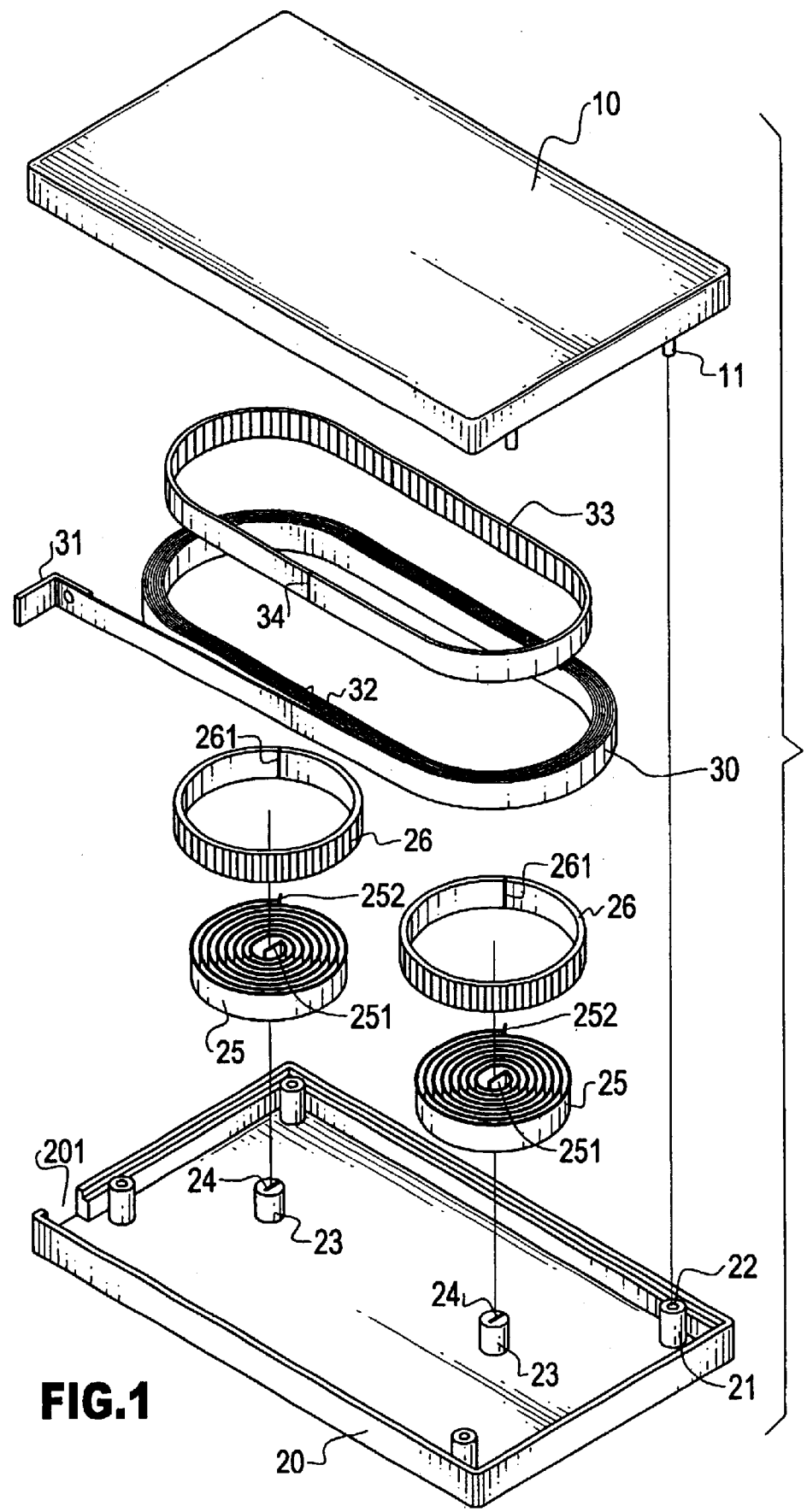
FIG. 1 is an exploded perspective view of a retractable tape measure in accordance with the present invention.
Figure 2:
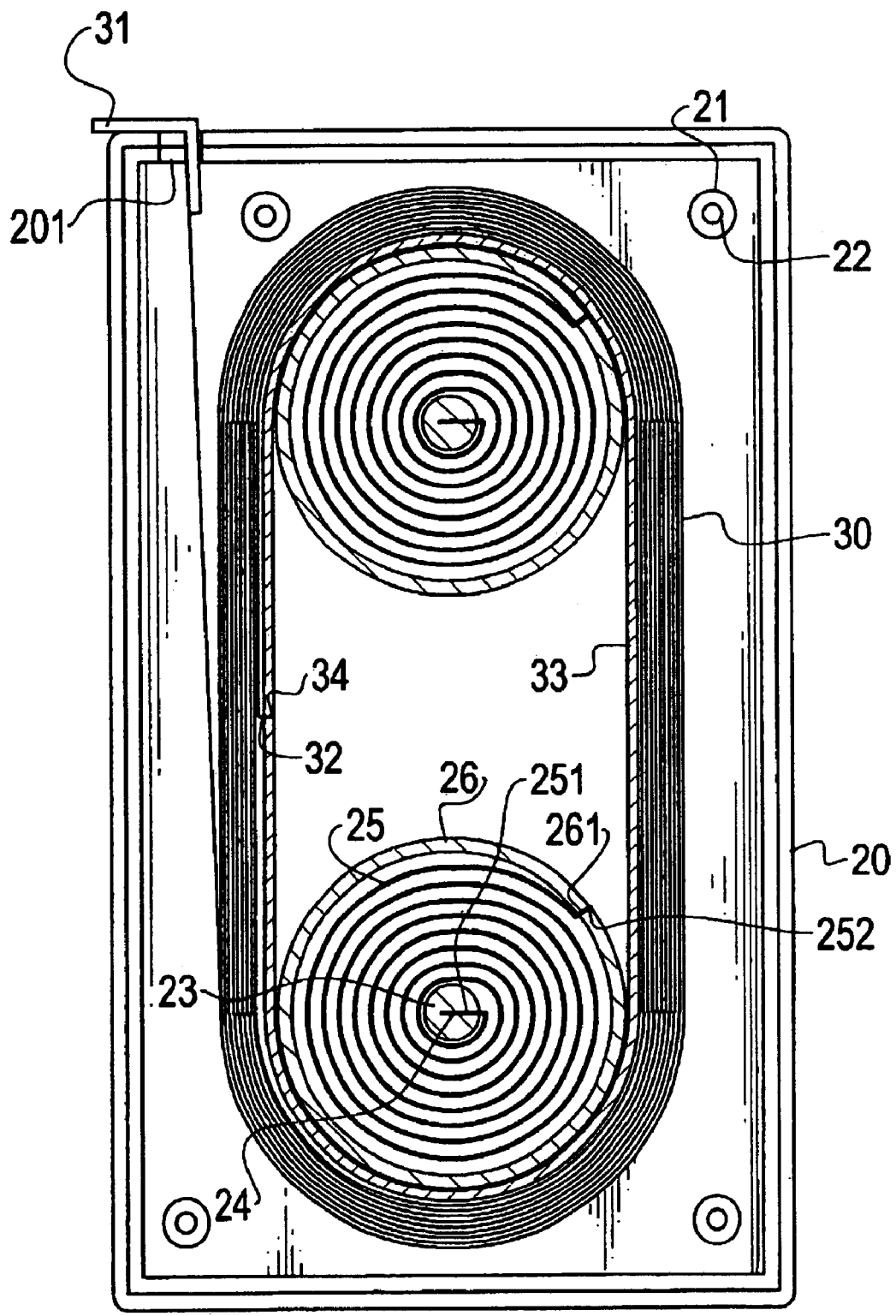
FIG. 2 is a top plan view of the retractable tape measure in FIG. 1 with the top cover removed.
Figure 3:
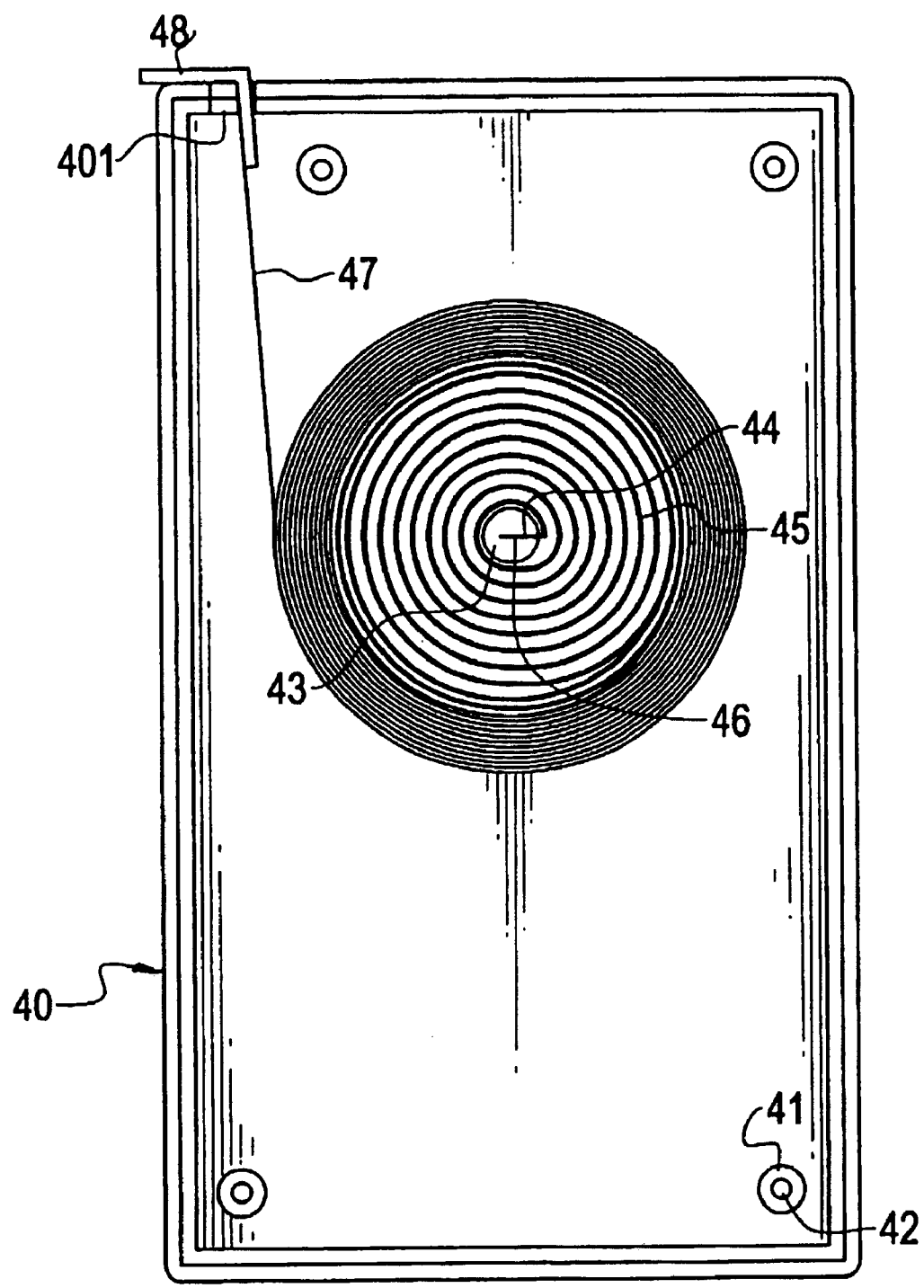
FIG. 3 is a top plan view of a conventional retractable tape measure in accordance with the prior art with the top cover removed.

With reference to FIGS. 1 and 2, a retractable tape measure in accordance with the present invention comprises a cover (10), a base (20) and a calibrated tape (30).

The cover (10) has a top, four sides, four corners and four mounting posts (11). The top has four edges (not numbered) with a side extending down perpendicular from each edge, thereby forming an inside and an outside of the cover (10). A mounting post (11) is mounted inside the cover (10) near each corner.

The base (20) has a bottom, four sides, four corners, four mounting bosses (21), two spring pins (23), two flat coil springs (25) and two spring belts (26). A tape slot (201) is defined through one side of the base (20). The bottom has four edges (not numbered) with a side extending up perpendicular from each edge, thereby forming an inside and an outside of the base (20) and four corners. The mounting bosses (21) are mounted inside the base (20) respectively near each corner corresponding to the mounting posts (11) inside the cover (10). A hole (22) is defined in each mounting boss (21), so the corresponding mounting post (11) can be inserted into the hole (22). The two spring pins (23) are mounted along a longitudinal centerline inside the base (20). A slot (24) is defined longitudinally in each pin (23). Each flat coil spring (25) has an inner end (not numbered) and an outer end (not numbered). A central hook (251) is defined on the inner end of each coil spring (25). The central hook (251) of each flat coil spring (25) is mounted in the slot (24) to securely attach the flat coil spring (25) to the corresponding pin (23). A circumferential hook (252) is defined on the outer end of each coil spring (25). Each spring belt (26) has an inside and an outside. Transverse ribs are formed on the outside of each spring belt (26). A transverse slit (261) is defined on the inside of each spring belt (26). A spring belt (26) is mounted around each coil spring (25), and the circumferential hook (252) on the outer end of each coil spring (25) is securely mounted in the transverse slit (261) in the corresponding spring belt (26).

The calibrated tape (30) has a proximal end (not numbered) and a distal end (not numbered) and is wrapped around an elliptical belt (33). A rigid lip (31) is attached perpendicular to the distal end of the calibrated tape (30). A belt hook (32) is formed on the proximal end of the calibrated tape (30). The elliptical belt (33) has an inside and an outside. The belt hook (32) is mounted in a transverse slit (34) defined on the outside of the elliptical belt (33).

The inside of the elliptical belt (33) has a rough surface and is mounted around the outside of the two spring belts (26). The belt hook (32) on the proximal end of the calibrated tape (30) is inserted into the transverse slit (34), and the calibrated tape (30) is wound around the elliptical belt (33) with the rigid lip (31) on the distal end of the calibrated tape (30) through the tape slot (201). The retractable tape measure in accordance with the present invention is essentially the same size as a conventional tape measure. However, the elliptical belt (33) mounted around the two flat coil springs (25) has a circumference significantly larger than that of a single coil spring. Consequently, a much longer calibrated tape (30) can be wound around the elliptical belt (33) so the retractable tape measure in accordance with the present invention can measure a much longer distance. The user pulls the calibrated tape (30) with the rigid lip (31) out from the base (20) when the user wants to measure with the retractable tape. The elliptical ring (33) will be actuated to rotate when the retractable tape (30) is pulled out from the base (20), and the two spring belts (26) will be actuated to rotated by the retractable tape (30) so as to tighten the coil springs (25). Accordingly, the two coil springs (25) have a resilient force to pull the retractable tape (30) back to the base (20) automatically when the user releases the retractable tape (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retractable tape measure comprising:
    a cover having
        a top with four edges,
        four sides respectively extending down perpendicular from the edges of the top to form an inside and an outside of the cover,
        four corners each formed at a conjunction of adjacent sides, and
        four mounting posts respectively mounted inside the cover near the corners;
    a base attached to the cover and having
        a bottom with four edges,
        four sides respectively extending up perpendicular from the edges to form an inside and an outside of the base,
        four corners each formed at a conjunction of adjacent sides, a tape slot defined through one side,
        four mounting bosses with a hole in each boss mounted inside the base respectively near each corner of the base and corresponding to the mounting posts inside the cover so the corresponding mounting post can be inserted into the hole,
    two spring pins mounted along a longitudinal centerline inside the base with a slot defined longitudinally in each pin,
    two flat coil springs respectively mounted on the two spring pins, each flat coil spring having
        an inner end,
        an outer end,
        a central hook defined on the inner end and mounted in the slot to securely attach the flat coil spring to the corresponding pin, and
        a circumferential hook defined on the outer end, and
    two spring belts mounted respectively around the flat coil springs, each spring belt having
        an inside,
        an outside, and
        a transverse slit defined on the inside of each spring belt in which the circumferential hook on the outer end of the corresponding coil spring is securely mounted; and
    a calibrated tape wrapped around an elliptical belt that is mounted around the two spring belts,
        the calibrated tape having
            a proximal end,
            a distal end,
            a rigid lip attached perpendicular to the distal end and extending through the tape slot to keep the calibrated tape from being drawn completely into the base, and
            a belt hook formed on the proximal end, and
        the elliptical belt having
            an inside,
            an outside, and
            a transverse slit defined on the outside in which the belt hook on the proximal end of the calibrated tape is securely attached so the calibrated tape is wound around the elliptical belt.

2. The retractable tape measure as claimed in claim 1, where transverse ribs are formed on the outside of each spring belt.

3. The retractable tape measure as claimed in claim 1, where the inside of the elliptical belt has a rough surface.

* * * * *